United States Patent

[11] 3,533,439

| [72] | Inventor | John P. Hall<br>Niles, Illinois |
|---|---|---|
| [21] | Appl. No. | 767,941 |
| [22] | Filed | Oct. 16, 1968 |
| [45] | Patented | Oct. 13, 1970 |
| [73] | Assignee | Baxter Laboratories, Inc.<br>Morton Grove, Illinois<br>a corporation of Delaware |

[54] ROLLER CLAMP
3 Claims, 5 Drawing Figs.

| [52] | U.S. Cl. | 137/595,<br>251/6 |
|---|---|---|
| [51] | Int. Cl. | F16k 7/06 |
| [50] | Field of Search | 251/4, 6, 9;<br>137/595 |

[56] References Cited
UNITED STATES PATENTS

| 1,686,003 | 10/1928 | Hottinger | 251/6X |
| 3,016,915 | 1/1962 | Moeller | 137/595 |
| 3,099,429 | 7/1963 | Broman | 251/6 |
| 3,135,259 | 6/1964 | Evans | 251/6X |
| 3,316,935 | 5/1967 | Kaiser et al. | 137/595 |
| 3,411,534 | 11/1968 | Rose | 137/595 |

*Primary Examiner*—William F. O'Dea
*Assistant Examiner*—Richard Gerard
*Attorneys*—Robert G. Pollock and Walter C. Kehm

ABSTRACT: A roller clamp unit having a body with a pair of oppositely disposed side walls integrally joined to a bottom wall, said side walls and said bottom wall each being equipped with a track extending longitudinally of said body and in parallel relation one to another, a roller equipped with axle means and mounted for rotational movement in said tracks longitudinally of said body, said bottom wall being further equipped with planes and said roller being further equipped with cams mounted for rotation with said axle means and adapted for operating selectively with said planes for compressing and depressing flexible tubes carried in the tube-way between said cams and said planes.

Patented Oct. 13, 1970
3,533,439
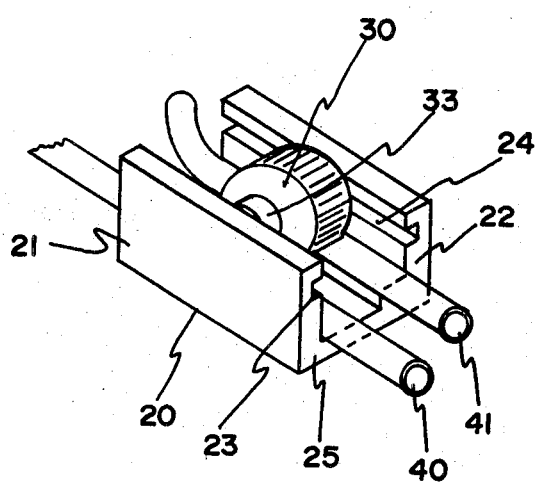
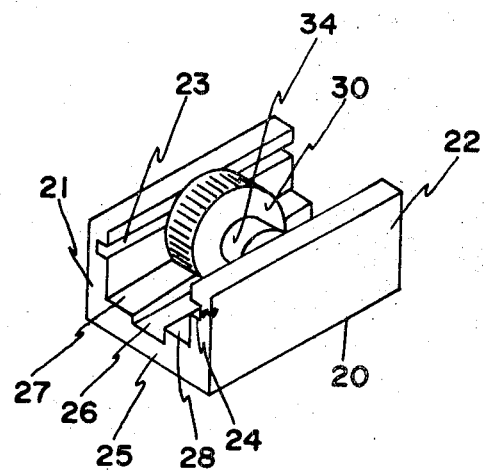
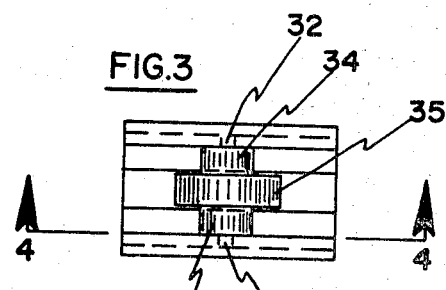
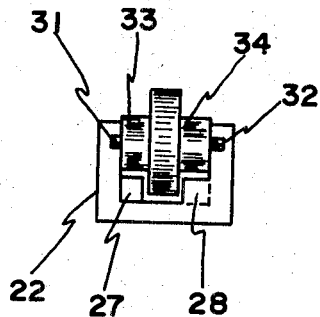
INVENTOR
JOHN P. HALL
BY *Walter C. Kehm*
ATTORNEY

ROLLER CLAMP

This invention relates to a fluid flow control device for flexible tubing. More particularly, this invention relates to a roller clamp unit for the purpose of controlling the flow of fluid through a plurality of flexible tubes.

In the administration of parenteral fluids and in the collection of blood and other medical procedures it is highly desirable to have a conveniently operated clamp or external valve for turning on or off or otherwise regulating the flow of fluid through a length of flexible tubing. Various roller-type clamps which can be manually operated are well adapted to this purpose. Illustrative examples of the roller-type clamp are described in U.S. Pat. Nos. 3,099,429, 3,135,259 and 3,189,038. The fundamental feature of these devices consists of a knurled roller movably trunnioned in a tube-way with the roller being positioned relative to an inclined wall to exert varying degrees of wedgelike pressure on the tubing to provide a fine degree of control.

In some medical procedures, for example, in thoracentesis or chest surgery and in secondary administration of parenteral fluids, a plurality of tubings are generally used for sequential fluid flow through separate conduits. For these medical procedures, fluid flow control devices for simultaneous operation on a plurality of flexible tubes are desirable. A slide-type clamp recently disclosed in U.S. Pat. No. 3,316,935 is illustrative of these types of devices.

It is an object of the present invention to provide an improved fluid flow control unit for a plurality of flexible tubes.

It is another object of the present invention to provide a roller clamp unit for the simultaneous control of fluid flow in a plurality of flexible tubes.

It is a further object of the present invention to provide a roller clamp unit for manually regulating the flow of fluid through a plurality of flexible tubes which is conveniently adapted to medical procedures such as thoracentesis, secondary administration of parenteral fluids and the like procedures.

Other objects and advantages of the present invention will be apparent to the person skilled in the art after reading the specification and claims hereof.

Briefly stated, the roller clamp unit of this invention comprises a body with a pair of oppositely disposed side walls integrally joined to a bottom wall so as to form a trough-like shape or tube-way. The side walls are each equipped with a longitudinally-extending recess or track on the inner side. These recesses are adapted for supporting the ends of the axle of a roller mounted for rotational movement in the recesses longitudinally of the body. The bottom wall is equpped with a plurality of planes and the roller is equipped with a plurality of cams operating selectively with said planes and adapted for compressing a plurality of flexible tubes which can be carried between said cams and said planes.

While the specification concludes with claims particularly pointing out and distinctly claiming the subject matter regarded as forming the present invention, it is believed that the invention will be better understood from the following exemplary description taken in connection with the accompanying drawings in which:

FIGS. 1 and 2 are perspective views of a roller clamp unit embodying principles of the present invention. FIG. 1, in particular, shows the adaptation of the clamp for carrying a plurality of flexible tubes in a tube-way whereas FIG. 2 shows the clamp without these tubes.

FIG. 3 is a top elevational view of the roller clamp of FIG. 2.

FIG. 4 is a transverse sectional view of the roller clamp taken along the lines 4–4 of FIG. 3.

FIG. 5 is a front elevational view of the roller clamp of FIG. 2.

Referring now to the drawings and particularly to FIGS. 1 and 2, the reference numeral 20 is used to indicate generally the body of the roller clamp unit having a pair of oppositely disposed side walls 21 and 22 integrally joined to a bottom wall 25 to form a trough-like shape or tube-way for carrying roller 30 and a pair of flexible tubes 40 and 41. Side walls 21 and 22 are each equipped with longitudinally-extending recesses or tracks 23 and 24 on the inner side of the walls in parallel relation for supporting axially mounted roller 30, and bottom wall 25 is equipped with a longitudinally-extending recess or track 26 for permitting backward and forward movement of said roller 30 as it is simultaneously moved in said recesses 23 and 24 longitudinally of said body 20. Bottom wall 25 is equipped with a pair of oppositely sloping planes 27 and 28 and roller 30 is equipped with a pair of cylindrical cams 33 and 34 adapted for operating selectively with said planes for exerting wedgelike pressure on tubes 40 and 41 carried between said cams 33 and 34 and said planes 27 and 28 in the tube-way of body 20.

FIGS. 3–5 show the roller 30 which is equipped with a pair of trunnions 31 and 32 for axial mounting in recesses 23 and 24. Planes 27 and 28 have equal but opposite slopes whereby the increasing wedgelike pressure on tube 40 carried between cam 33 and plane 27 coincides with a correspondingly decreasing wedgelike pressure on tube 41 carried between cam 34 and plane 28 as roller 30 is advanced longitudinally of body 20. Roller 30 preferably has knurls or ridges 35 for better manual control or thumb operational movement and cams 33 and 34 likewise preferably have knurls or ridges 36 and 37 for immobilization of roller 30 after it has been advanced to the desired position whereby it is relatively "drift-free" in operation.

In operation of the roller clamp unit, flexible tubes 40 and 41, which carry fluids generally in the same or opposite directions, are gradually compressed or depressed as roller 30 is manually advanced to and fro longitudinally of body 20. Thus, the fluid flow through tube 40 is gradually decreased as the fluid flow through tube 41 is correspondingly gradually increased, thereby providing a convenient two-way external stopcock for said tubes 40 and 41.

By suitable variation in the slope of planes 27 and 28 and/or the shape of cams 33 and 34, the compression and depression on tubes 40 and 41 can be appropriately controlled to any desired amount or rate. Thus, a greater slope in planes 27 and 28 will provide for a more rapid rate of increasing or decreasing pressures as roller 30 is advanced longitudinally of body 20 whereas a lesser slope will provide for a more gradual change in said pressures under ordinary manual operation conditions. Similar such changes in pressure can be accomplished by variations in the shape of cams 33 and 34. For example, one of said cams can have a circular periphery while the other cam has an elliptical periphery, whereby the fluid flow through one tube will change at a different rate than the fluid flow through the other tube as the roller is advanced longitudinally of body 20.

In the medical procedure of thoracentesis, tubes 40 and 41 can be connected to a Y-shaped tube leading to a syringe at one end of body 20. The opposite ends of tubes 40 and 41 can be connected, respectively, to a needle and to a reservoir. As roller 30 is advanced in a direction so that tube 40 is in the open and tube 41 in the closed position, the syringe can be used to withdraw fluid from the patient by pulling a vacuum on the syringe. Then as roller 30 is advanced in the reverse direction so that tube 40 is in the closed and tube 41 in the open position, the syringe can be used to force the fluid into the reservoir by exerting a positive pressure on the syringe. Thus, the two-way roller clamp permits the continuous withdrawal of fluid from the patient and collection in a a reservoir without repeated insertion and removal of the needle from said patient. Also, the external operation of the roller clamp overcomes the problem of valve blockage caused by clots and other particulate matter as frequently occurs with the conventional internal type stopcock used in this medical procedure.

In the secondary administration of parenteral fluids, two fluids from separate sources can be conveniently administered to the patient through a Y-shaped tube simultaneously at different or equal rates or alternately separatly by manual operation of the roller clamp unit of this invention.

An example of a medical procedure requiring fluid flow control for three lengths of tubing to which the roller clamp unit of this invention is adapted is an ascitic fluid infusion procedure which employs the sequential administration of dextrose solution and the withdrawal and reinjection of ascitic fluid in the patient. For this procedure, the roller clamp will preferably comprise a roller with three cams and a bottom wall with three inclined planes.

It will be apparent that many modifications and variations can be made to the particular embodiments of the invention described hereinbefore. For example, a multiplicity of tubes can be accommodated in the tube-way of body 20 by providing for a multiplicity of cams and planes for selective operation with one another in the forgoing manner. Thus, for example, roller 30 can have a pair of cams on each of its sides and a pair of planes can be disposed on each side of recess 26 longitudinally of body 20 for the control of fluid through four tubes. Likewise, body 20 can be equipped with more than one roller, if desired, in lateral disposition of each other. Each roller can be equipped with cams to exert pressure on a plurality of tubes to provide for a divided manual control whereby the fluid flow in one set of tubes can be controlled separately from the fluid flow in another set of tubes.

The roller clamp unit of this invention can be constructed of various conventional materials and manufactured by ordinary means. Preferably, the body of the roller clamp unit is constructed of a resinous plastic material, e.g., polyethylene or polypropylene, and conveniently molded as an integral unit or, alternatively, fabricated by sealing mating portions together. The roller also is preferably constructed of a resinous plastic material. It will be understood, however, that the roller clamp unit of this invention is not limited to any particular materials of construction or methods of manufacture.

Numerous other examples and various modifications and adaptations of the foregoing examples can be devised by the person skilled in the art after reading the foregoing specifications and appended claims without departing from the spirit and scope of the invention defined herein. All such further examples, modifications and adaptations are included within the scope of the invention as defined in the appended claims.

I claim:

1. A roller clamp unit comprising a body with a pair of oppositely disposed side walls intergrally joined to a bottom wall, said side walls and said bottom wall each being equipped with a recess extending longitudinally of said body and in parallel relation one to another, a roller equipped with axle means and mounted for rotational movement in said recesses longitudinally of said body, said bottom wall being further equipped with a plurality of planes and said roller being further equipped with a plurality of cams mounted for rotation with said axle means and adapted for operating selectively with said planes for compressing and depressing a plurality of flexible tubes carried in the tube-way between said cams and said planes.

2. A roller clamp unit in accordance with claim 1 wherein the roller is equipped with a pair of cylindrical cams and the bottom wall is equipped with a pair of oppositely sloping planes to exert a wedgelike pressure on a pair of flexible tubes.

3. A roller clamp unit in accordance with claim 2 wherein the oppositely sloping planes have equal slopes to provide a two-way external stopcock for a pair of flexible tubes.